July 27, 1954
C. H. O. BERG
2,684,867
CONVEYANCE OF GRANULAR SOLIDS
Filed Jan. 16, 1951
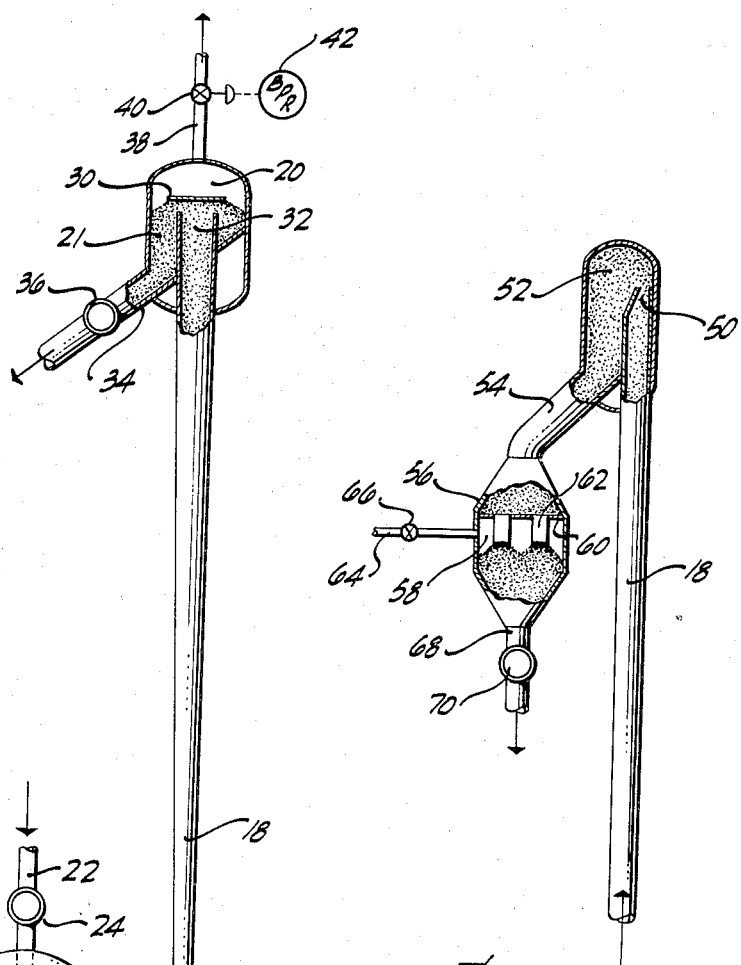
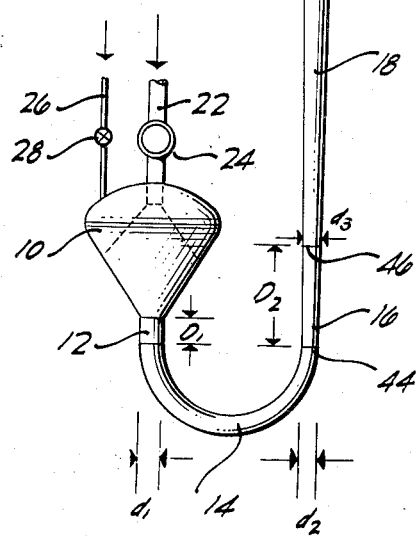
FIG. 1.
FIG. 2.
INVENTOR.
CLYDE H. O. BERG,
BY
AGENT.

Patented July 27, 1954

2,684,867

UNITED STATES PATENT OFFICE 2,684,867

CONVEYANCE OF GRANULAR SOLIDS

Clyde H. O. Berg, Long Beach, Calif., assignor to Union Oil Company of California, Los Angeles, Calif., a corporation of California Application January 16, 1951, Serial No. 206,169

25 Claims. (Cl. 302—17)

This invention relates to the conveyance of granular solids and in particular relates to the conveyance of such solids through conduits under the influence of a cocurrently depressuring conveyance fluid while maintaining the granular solids in substantially compact form. Specifically the present invention relates to an improved method and apparatus for introducing compact granular solids into such a conveyance conduit and also, in combination with such apparatus, an improved means for discharging granular solids from the conveyance conduit which also maintains the solids in a compact state while in transit, which combination has been found unusually stable in operation.

The movement of granular solids in appreciably large quantities presents a technical problem in many industrial operations such as the movement of cracking catalysts in the well-known T. C. C. and fluid cracking processes, the conveyance of sand from tar sand retorting processes, the movement of ores and coal in metallurgical operations, and in many other industrial processes in which large quantities of granular solids are employed. Problems are encountered particularly when granular solids must be transported continuously at high volumetric flow rates, or under pressure, or under conditions where losses of the solids due to attrition or abrasion must be minimized. Such conditions are pronounced in the transportation of expensive granular catalysts which are required to be circulated at rates of as high as 800 to 1,000 tons per hour as, for example, in catalytic cracking processes employing high catalyst-to-oil ratios.

Conventionally granular solids are conveyed by moving mechanical equipment such as bucket elevators, the various forms of belt conveyors and other apparatus such as open or enclosed drag lines. For atmospheric pressure operations such mechanical equipment adequately serves to transport the granular solids at moderate rates. However, when the solids are desirably transported at high flow rates, or in connection with processes in which fluids under pressure contact the granular solids, or in processes where the attrition loss of granular solids must be kept at a minimum, numerous disadvantages of such mechanical conveyances present themselves. Among these problems is the size of the equipment necessary to transport large quantities of granular solids. For example, the bucket elevators necessary to transport cracking catalyst at a rate of about 150 tons per hour are approximately 4 feet in length, 1 foot in width, and 1½ feet deep. Furthermore, the maintenance of the necessary driving mechanism at temperatures of the order of those in the cracking processes is difficult and expensive. Furthermore, the quantity of granular solids lost by attrition in loading and unloading the buckets is frequently excessive.

It is therefore an object of the present invention to provide an improved method for the conveyance of granular solids through relatively small sized equipment at relatively high volumetric flow rates without the disadvantages inherent in conveyors having moving mechanical parts.

It is an additional object of this invention to provide a method for the conveyance of granular solids in which no moving mechanical equipment is employed and the conveyance is effected by a depressuring cocurrent flow of a conveyance fluid through a conduit carrying the granular solids in substantially compact form.

It is a more particular object of the present invention to provide an improved method for the injection of granular solids into a conveyance zone in which compact granular solids are conveyed.

A more specific object of this invention is to provide an improved conveyance process for compact granular solids in which the granular solids are passed by gravity from an accumulation through a specially designed inlet zone of progressively decreasing cross-sectional area and subsequently through a transition zone of increasing cross-sectional area into the conveyance zone proper.

An additional object is to provide such a conveyance process in combination with an improved step for discharging solids from such a conveyance zone, which step involves the restriction of the cross-sectional area of the conduit outlet to restrict the delivery rate of solids without causing substantial restriction of the conveyance fluid discharge.

It is also an object of this invention to provide an apparatus adapted to effect the aforementioned objects.

Other objects and advantages of this invention will become apparent to those skilled in the art as the description thereof proceeds.

Briefly the present invention comprises the conveyance of substantially compact granular solids by means of a cocurrently depressuring conveyance fluid which may be liquid or gaseous. A consideration of the coefficient of expansion of the particular fluid employed is necessary in order that a constant conveyance force ratio, defined in Equation 3, be maintained throughout the conveyance zone for maximum efficiency. When liquid fluids are used or gaseous fluids are employed under conditions wherein the total pressure drop through the conveyance zone is less than about 5 per cent of the absolute inlet pressure, the expansion of the conveyance fluid is generally insufficient and requires no special means for maintaining a constant conveyance force ratio. In the other cases when gaseous fluids are used with a pressure drop exceeding about 5 per cent of the absolute inlet pressure, the expansion of the fluid causes substantial fluid velocity changes which result in the variation of the conveyance force ratio within the conveyance zone.

An additional factor must be considered in the maintenance of constant force ratios which is dependent upon the contribution (upon pressure decrease) of part of the conveyance fluid present in the void spaces of the solids to that part of the conveyance fluid which is considered to be flowing through the interstices of the granular solids. Thus, not only does expansion of the flowing conveyance fluid cause changes in the conveyance fluid velocity and the force ratio but also the expansion of conveyance fluid carried in the void spaces between individual particles has the same effect.

In order to compensate for these and other factors it has been found that by increasing the cross-sectional area of the conveyance zone in the direction of solids flow, a constant conveyance fluid velocity and force ratio may be maintained. For flows of gaseous fluids it has been found that the taper of the conveyance zone, or the change in cross-sectional area with distance from its solids inlet, required to maintain a constant force ratio is correlated by the following equation:

$$\frac{A_2}{A_1} = \frac{1}{A_1}\left(\frac{aQ}{\rho_s}\right)\left(\frac{m.\ w.}{RT}\right)^{1-\frac{1}{n}} (P_1 - P_2)\left(\frac{C}{P_2 \frac{dp}{dl}}\right)^{\frac{1}{n}} + \left(\frac{P_1}{P_2}\right)^{\frac{1}{n}} \quad (1)$$

wherein $a$ is the void fraction of the bulk of the solids, no units
$A$ = cross-sectional area of conduit, square feet
$C$ = permeability constant as determined from:

$$\frac{dp}{dl} = C\rho^{n-1}V^n \quad (2)$$

wherein $\frac{dp}{dl}$ is pressure gradient, pounds per square foot per foot $\rho$ is the fluid density, pounds per cubic foot
$V$ = superficial gas velocity, feet per second
$n$ = exponent; 1.0 for viscous flow and 1.85 for turbulent flow $P$ = pressure in conduit; pounds per square foot
$Q$ = solids flow rate; pounds per second
$R$ = gas constant; 1543 foot pounds per ° R per pound mol
$T$ = temperature; °R = 460 + ° F.
$\rho_s$ = bulk density of solids; pounds per cubic foot
1 = subscript, reference to inlet of conduit section considered
2 = subscript, reference to outlet of conduit section considered (Other consistent units may be substituted)

Therefore, by employing the above correlation a line for solids conveyance may be designed with a constant conveyance force ratio throughout. Where the distance of conveyance and the characteristics of the solids are known, the change in pressure (which is linear) can be calculated knowing that $$\frac{\frac{dp}{dl}}{\rho_s \cos \theta} \geq 1.0 = 1.1 \quad (3)$$

wherein $\theta$ is the angular deviation of the conduit from the vertical and other terms are given above. The value of $A_1$ is determinable from well known correlations of the rates of gravity flow of granular solids from orifices of various cross-sectional areas.[1] From the required solids delivery rate the cross-sectional area $A_1$ is selected, the solids delivery rate $Q$ is known, the void fraction $a$, the bulk density of the solids, $\rho_s$ and the solids permeability factor $C$ are determined from the granular solids physical characteristics. $P_2$ is the desired line outlet pressure and $P_1$ is estimated from the length of the line and from a known value of the conveyance force ratio, for example a value of 1.1. The reverse procedure is permissible, i. e. the estimation of $P_2$ from the known $P_1$. Using Equation 1 and the foregoing data, values of $A_2$ are determined for various lengths from the solids inlet by considering successive lengths of the conveyance zone or an estimation of the overall area change may be made by a similar calculation over the entire length of the conveyance zone.

The specific improvement of the present invention resides in the controlled variation in the conveyance force ratio or the pressure gradient while passing the granular solids from a solids reservoir to the conveyance zone through an inlet zone or redirection zone and the maintenance of an increasing pressure gradient in the direction of flow therein. Certain problems are sometimes encountered in the conveyance of granular solids at very high rates of flow, for example, of the order of 30 to 60 lbs./min./sq. in. of conduit area, particularly where such solids contain fines which are apt to cause bridging and other phenomena well known in the solids handling art. One particular problem sometimes encountered is the formation of void spaces in the moving mass of granular solids causing the formation of a discontinuously moving mass of solids; that is, the solids present in the conveyance zone move along as slugs separated by relatively short distances of open space. This problem occurs when extreme flow rates are attempted, often with granular solids containing fines particles such as those originating through attrition.

It has been found that by varying the cross-sectional area of the inlet zone through which granular solids are redirected from a downward gravity flow to the flow direction of the conveyance zone proper, that not only is the problem of voids in the moving solids mass eliminated but it is found that the maximum permissible solids flow rate is appreciably increased. In a vertical conveyance zone a redirection or inlet zone comprising 180° return bend conduit is employed and granular solids flow by gravity from an induction zone or chamber, containing the granular solids to be conveyed, downwardly by gravity into and through an arcuate or curving ―――――
[1] A. T. Ch. E., vol. 41 (1945), p. 220.

inlet zone by the combination of decreasing forces of gravity and an increasing conveyance fluid pressure gradient. The variation in conveyance fluid pressure gradient is provided by decreasing the cross-sectional area of the inlet or redirection zone in the direction of solids flow to a value of between about 40% and 95% of the inlet area of the conveyance zone. The cross-sectional area at the entrance of the redirection zone is preferably sufficient to permit a gravity flow of granular solids at least equal to the desired maximum solids delivery rate, and is approximately the same as the entrance area to the conveyance zone.

A conveyance fluid under pressure is introduced into the induction zone and passes with the solids through the redirection zone. The quantity of conveyance fluid required is that necessary to establish a conveyance force ratio greater than 1.0 at the entrance to the conveyance zone proper. From the foregoing two considerations, namely the cross-sectional area at the entrance of the redirection zone and the cross-sectional area at the entrance of the conveyance zone proper, the degree of cross-sectional area change in the redirection zone is determined. The cross-sectional area at the outlet of the redirection zone is sufficiently decreased to establish a conveyance force ratio at this point greater than about 1.1. Typical values for the ratio at this point lie between 1.2 and 5.0 and preferably values between about 1.5 and about 3.0 are utilized.

The granular solids thus passed from the induction chamber through the redirection zone are discharged therefrom under conditions of conveyance force ratio considerably higher than the minimum required for conveyance. The solids are then passed through a communicating transition zone in which an increasing cross-sectional area in the direction of flow is provided to provide for the smooth transfer of granular solids from the outlet of the redirection zone to the entrance of the conveyance zone. The taper of the transition zone is preferably greater than that of the conveyance zone and the length is preferably between 2 and 20 times the diameter of the conveyance zone entrance since a transition zone which is too long unduly increases the force ratio through an unnecessarily long length of the line whereas one which is too short produces uneven flow.

It has been found from the combination of steps above described that increased maximum solids delivery rates are permitted even with granular solids having a tendency to form voids and which cause fluctuating pressure in the equipment associated with the conveyance conduit.

A particularly desirable combination has been found in combining the modified solids injection process and apparatus with a modified process and apparatus for restricting the granular solids discharge from the conveyance zone. This restriction, as before described, maintains the granular solids in substantially compact form while in transit. The present modification of restricted outlet contemplates an inverse taper to the conveyance zone, that is, of decreasing cross-sectional area in the flow direction, which may be established by rolling the outlet of the conduit into an elliptical form having a cross-sectional area less than the maximum area provided in the conveyance zone itself.

One pronounced advantage not attainable with other means for solids flow restriction is that the thrust force required in the operation of the present invention is not lost by reason of granular solids draining from the separator chamber into which the conveyance zone discharges. Thus, when the conveyance of solids is stopped for any reason the separator chamber is apt to drain unless means are provided for preventing this event. In the present modification, granular solids flow may be initiated even though no solids are present in the separator chamber due to the restriction of the conveyance zone outlet and considerably higher solids delivery rates are permitted in the combination apparatus not heretofore obtained.

The restricted conveyance zone outlet herein briefly described is more clearly described and specifically claimed in a copending application Serial No. 206,170, filed of even date herewith.

The process and apparatus of the present invention will be more clearly understood by reference to the accompanying drawings in which:

Figure 1 illustrates an elevation view in partial cross-section of the improved apparatus of this invention employing a tapered inlet or redirection zone and, Figure 2 shows an elevation view in partial cross-section of the improved separator chamber containing a restricted conveyance zone outlet.

Referring now more particularly to Figure 1, the essential elements of the improved apparatus according to this invention include solids induction chamber 10, redirection or inlet zone 14, conveyance zone 18, and separator chamber 20. Induction chamber 10 communicates directly with redirection zone 14 through connecting zone 12 and redirection zone 14 communicates through transition zone 16 with conveyance zone 18. Granular solids are introduced into induction zone 10 through line 22 controlled by means 24. The latter element 24 may be either a shut-off valve when intermittent or batch-wise conveyance of granular solids is desired, or may be one of the well known improved types of pressure-tight star feeders presently available. The star feeder permits the continuous introduction of granular solids into chamber 10 against a higher pressure existing therein. The conveyance fluid is introduced via line 26 at a rate controlled by valve 28. Preferably valve 28 is automatically actuated to maintain a predetermined conveyance fluid pressure ($P_1$) therein, or may be regulated to provide a constant fluid input to chamber 10.

The granular solids discharge successively through zones 12, 14, 16 and through conveyance zone 18 into separator 20. Thrust plate 30 is disposed transverse to and adjacent outlet opening 32 of conveyance zone 18. This plate establishes a thrust force against the discharging solids which maintains the granular solids in substantially compact form while in motion in the conduit. Granular solids discharge from separator chamber 20 via line 34 at a rate controlled by element 36 which may, like element 24, comprise a control valve or an improved star feeder. Depressured conveyance fluid ($P_2$) is discharged from chamber 20 via line 38 at a rate controlled by valve 40 in accordance with back pressure regulator 42. The depressured fluid may be recompressed and injected into induction chamber 10.

The granular solids flow through connecting zone 12 is preferably downward and the diameter $d_1$ of this zone is preferably such that the gravity flow rate through such an area is at least equal to the required maximum solids flow rate in the conveyance zone. The gravity flow discharge of granular solids through an opening of given cross-sectional area may be determined from any one of the many well known correlations of such data previously indicated. The length $D_1$ of connecting zone 12 is preferably at least equal to its own diameter $d_1$ and preferably between 1 and 5 diameters. The function of connecting zone 12 is not too well understood; however, it has been found very effective in improving the performance of the conveyance conduit under high rates of flow of solids having a tendency to form voids. It is believed that zone 12 acts in some measure as a redirection zone, particularly for those granular solids flowing down the side of the conical bottom of chamber 10 nearest to the redirection and conveyance conduits. From a non-vertical path these solids attain in zone 12 a vertical downward path and are smoothly delivered into the arcuate redirection zone 14. In the absence of connecting zone 12 the particular granular solids referred to flow first in one non-vertical direction and then sharply change to a curving path in the opposite direction.

The conveyance force existing in connecting zone 12 acts in the same direction as gravity and the granular solids and conveyance fluid delivered therefrom into redirection zone 14 pass therethrough under conditions of gradually increasing conveyance force ratio and a gradually decreasing gravitational force in the flow direction. The diameter of redirection zone 14 decreases from $d_1$ to $d_2$ under such conditions that a conveyance force ratio at the exit 44 of redirection zone 14 is preferably between about 1.5 and 3.0. Thus, while the solids are passed through a path in which an advantageous gravitational force is lost and disadvantageous gravitational force is obtained, as where solids are delivered to a vertical conveyance zone, the conveyance force ratio is increased to a value considerably above the minimum value (1.0) necessary to maintain vertical flow by decreasing the cross-sectional area of the redirection zone to between 40 and 95% of the entrance area of the conveyance zone.

Granular solids are discharged from redirection zone 14 into transition zone 16 of length $D_2$ and of increasing inside diameter from $d_2$ to $d_3$, the latter being the entrance diameter to conveyance zone 18. The length $D_2$ is preferably between 2 and 20 times conveyance zone entrance diameter $d_3$. In this zone the conveyance force ratio is smoothly decreased from the maximum value employed at transition zone entrance 44 to the desired minimum and constant value somewhat in excess of 1.0 employed throughout conveyance zone 18. With a known cross-sectional area at entrance 46 of conveyance zone 18 the required cross-sectional area of entrance 44 of transition zone 16 for a desired maximum force ratio at the exit of the inlet zone may be determined from the following relation:

$$\left(\frac{F_2}{F_1}\right) = \left(\frac{A_1}{A_2}\right)^n \quad (4)$$

wherein F is the conveyance force ratio, A is the cross-sectional area of a zone through which solids are passing and $n$ is an exponent and its value is 1.0 for viscous flow and 1.85 for turbulent flow of conveyance fluid. Subscripts 1 and 2 refer to the inlet and outlet of the particular section of conduit considered. Thus, across the transition zone with a known outlet conveyance force ratio where $F_2$ is equal to 1.1 and a desired entrance conveyance force $F_1$ of between 1.5 and 3.0, the value of $A_1$ at entrance 44 of transition zone 16 may be determined from Equation 4. Entrance area 46 of conveyance conduit 18 is determined from the correlation of gravity solids discharge as was the area for connecting zone 12.

The cross-sectional area of conveyance zone 18 varies in accordance with the correlation given above to maintain a constant conveyance force ratio throughout its length, that is at a value between about 1.1 and 1.5, preferably. The granular solids and the depressured conveyance fluid discharge as described above into separator chamber 20 from which each stream is separately removed.

Referring now particularly to Figure 2, a modification of apparatus is shown which may be substituted for separator chamber 20 and associated equipment to provide an improved combination adaptable to high flow rates of granular solids. Conveyance zone 18 carrying compact moving granular solids terminates in a restricted outlet 50 within reversing zone 52. The cross-sectional area of opening 50 is preferably between about 60% and 99% of the maximum cross-sectional area of conveyance zone 18. Reversing zone 52 communicates via line 54 with separator chamber 56 containing depressured conveyance fluid disengaging zone 58. The disengaging zone comprises a transverse plate 60 provided with dependent downcomers 62 through which the granular solids flow and around which beneath plate 60 is formed fluid disengaging space 58. Depressured conveyance fluid is removed from zone 58 via line 64 at a rate controlled by valve 66 which may be a back pressure regulator. The conveyed granular solids pass from chamber 56 via line 68 through solids flow control means 70 which, like elements 24 and 36 in Figure 1, may comprise a flow control valve or an improved star feeder.

The principal feature of the apparatus described above is that upon termination of granular solids flow the granular solids contained within reversing zone 52 may at least partially drain away from orifice 50 of the conveyance zone. In the apparatus shown in Figure 1 such an effect would eliminate the ability of thrust plate 30 to apply the thrust force required to maintain the solids in compact form until solids accumulate within zone 20 in mass 21. In the apparatus shown in Figure 2 this problem is eliminated as the thrust force is generated in a direction counter to the solids flow by passing the granular solids and the conveyance fluid through an outlet opening 50 of decreased cross-sectional area. This restriction immediately increases the conveyance force at this point to a value above the value maintained within the conveyance zone proper, i. e., values of 1.1 to 3.0 being suitable, and an opposing thrust force is generated. Thus, when solids flow discontinues and chamber 52 drains, restriction 50 provides the thrust force required in the absence of an accumulation of granular solids surrounding the opening.

It has further been found that a combination of the restricted outlet apparatus just described with the tapering inlet for the introduction of solids into the conveyance conduit comprises an apparatus having an inherently increased solids flow capacity even with troublesome solids referred to above, and which is characterized by the complete absence of voids formation during solids transit. At constant flow rates of solids, differential pressure indications along the length of redirection zone 14, transition zone 16 and conveyance zone 18 indicate that no void spaces are formed in the granular solids during movement and that the differential pressures existing over incremental lengths of the conveyance path are constant. The presence of void spaces in the conduit is indicated by a fluctuation in the differential pressure indication as the void passes the incremental length over which the differential pressure is determined.

The following data are illustrative of the construction and operation of the improved conveyance process and apparatus according to this invention.

Example I

In a conveyance conduit 28 feet in length, disposed vertically, granular cracking catalyst is conveyed under the influence of compressed air as a conveyance fluid. The conveyance conduit increases from 3 inches inside diameter at the conveyance zone entrance to 4 inches inside diameter maximum. The redirection zone is a return bend 18.25 inches between the vertical axis of downward solids delivery from the induction chamber to the vertical axis of the conveyance zone. The inlet or redirection zone has an entrance diameter inside of 4 inches, tapering at the entrance of the transition zone to 2.5 inches inside diameter. The transition zone is 39 inches long (13 conveyance zone diameters) and increases throughout that length from 2.5 inches inside diameter to the entrance diameter of the conveyance zone, i. e., 3.0 inches.

Example II

The conveyance apparatus of Example I delivers 38,000 lbs./hour of granular cracking catalyst under an established inlet pressure of 12 lbs./sq. in. gauge and an outlet pressure of 2.0 inches of water. The conveyance force ratio at the entrance to the transition zone is 1.96 and at the entrance of the conveyance zone is 1.1. Even at such high rates of flow as here attained no evidence of voids formation in the line is indicated.

Example III

Substituting a 180° return bend redirection zone having a constant cross-sectional area for the tapered redirection zone of Example I, a solids delivery rate of 30,000 lbs./hour is obtained under the same operating conditions.

Example IV

The outlet of the conveyance conduit was rolled, forming the outlet into an elliptical shape having a major diameter of 4.125 inches inside and a minor diameter of 3.50 inches inside. The maximum diameter of the conveyance conduit was 4.00 inches inside diameter. The conveyance force ratio increases from 1.1 in the conveyance zone to a value of 1.325 in the restricted outlet of the conveyance conduit and subsequently drops to well below 1.0 in the reversing chamber. Startup of the conveyance conduit is smooth and no fluidization of granular solids results even though the separator chamber or reversing chamber is free of solids at the time.

In the present specification the term "substantially compact form" is intended to indicate a mass of solids having an operating bulk density which is substantially the same as the vibrational static bulk density of the solids determined when at rest and in the absence of moving fluids. To determine whether or not the solids in a conveyance line or any portion thereof are moving in substantially compact form, resort may be had to any one of the following methods, which involve determination of bulk densities directly, or differential pressures, or changes in differential pressures with changes in flow rate of the conveying fluid. The first method to be discussed involves direct measurement of bulk densities.

The usual determination of the bulk density of granular solid is made in a vessel of known volume by applying vibrational forces to a known mass of solid granules. It is indicated that the moving solids in the apparatus of this invention are in the form of a continuous porous mass having an operating bulk density which is substantially the same as this vibration bulk density. The granular solids are conveyed in this state by means of a conveyance fluid depressuring through the substantially compact moving mass of granular solids so that substantially no fluidization or aeration or expansion of the porous mass of solids occurs to change the bulk density of the moving mass from this value.

It is recognized that the bulk density of a mass of granular solids is not always constant, but varies with the geometry of the particle arrangement. For example, a given mass of uniform spherical granules will have the least bulk density when systematically packed with particle centers coinciding with the corners of a cube (cubic packing—pore volume 47.64%[1]) and the greatest bulk density (about 41.5% greater) when uniformly packed with particle centers coinciding with the apexes of a tetrahedron (rhombohedral packing—pore volume 25.95%[1]). The bulk density of solids during conveyance according to this invention is intermediate between the bulk densities of solids uniformly packed according to the foregoing systems and is apparently a random mixture of several packing geometries. Similar density variations occur in packings of non-uniform and irregular particles.

In the conveyance system of the present invention such differences in packing arrangement apparently exist but they rarely if ever cause the bulk density of the moving solids to decrease more than 20% of the at-rest vibrational packed value and usually the decrease does not exceed about 5% of this value.

To illustrate the magnitude of the solids bulk density variation the following data are given typical of an operation for conveying compact solids:

| | |
|---|---|
| Conduit height, feet | 27.25. |
| Conduit attitude | Vertical. |
| Conduit diameter, inches: | |
|   Inlet | 3.068. |
|   Outlet | 4.000. |
| Conveyance fluid | Air. |
| Solids mesh size | 4–10. |
| Solids flow rate, lb./hr. | 4,500. |
| Solids vibrational bulk density lb./cu. ft. | 46.7. |

Upon depressuring the conveyance fluid from the bottom of the conduit while preventing further introduction of solids thereinto, it was noted that the solids level dropped only 0.25 feet from the solids outlet at the top of the 27.25 foot line indicating an operating solids bulk density of 46.3 pounds per cubic foot during conveyance. This is approximately an 0.85% decrease from the static value and in most cases the decrease is less than 2%.

---

[1] Micromeritics, J M Dalla Valle (1943), p. 105.

Thus the operational density of the flowing solids may be determined simply by depressuring the conveyance conduit from the inlet end so as to prevent continued introduction of solids from the induction chamber into the conduit proper and observing the change in position of the solids level at the conduit outlet as was done in obtaining the data above. The operating bulk density of the solids then may be calculated by multiplying the static vibrational bulk density determined as previously described, by the ratio of the volume of that portion of the conduit remaining full of solids to the total volume of the conduit.

If more convenient, or as a check determination, the operating bulk density may also be determined by depressuring the conduit as above, removing the granular solids from the entire conduit, weighing this material and dividing the weight by the volume of the conduit in question.

Another test for determining whether or not the flowing solids are in substantially compact form consists in observing the change in differential pressure over a selected length of the conveyance conduit effected by changing the rate of flow of the conveyance fluid. If fluidized or aerated solids suspensions and the conventional gas lift processes, increases in aeration or conveyance fluid flow decrease the density of the suspension being conveyed and correspondingly decreases this differential pressure while in the method of this invention increases in conveyance fluid flow rate through the compact solids increase the differential pressure markedly. This characteristic distinguishes the compact state of the granular solids flowing according to this invention from dense phase aerated suspensions of solids. For example, in a 140 foot long conduit carrying 500 tons per hour of compact granular cracking catalyst by means of compressed air, the pressure differential is 49.6 pounds per square inch. A 10% increase in the volume of air injected into the inlet of the conduit raises the differential pressure to 60 pounds per square inch. By comparison, a 140 foot conduit conveying 82,200 pounds per hour of 12–30 mesh adsorbent carbon as a dilute suspension in air the pressure differential is 1.12 pounds per square inch and a 10% increase in the air input decreases the pressure differential to 0.99 pound per square inch. Similarly, in aerated or so-called "fluidized" systems the pressure differential decreases with increase in gas velocity. Thus, it is seen that the magnitude of the pressure differential is on the order of 50 times greater in conveyance of compact solids than in dilute suspensions any in many cases is considerably greater. Furthermore, this pressure differential changes positively (increases) in the conveyance of substantially compact solids and negatively (decreases) in the conveyance of fluidized suspensions of solids with increases in conveyance fluid flow rate.

Still another test for "substantially compact form" involves measuring the pressure drop per unit length along the conduit and calculating the conveyance force ratio from Equation 3. Except in relatively rare cases when the operating bulk density is decreased by an amount approaching 20% of the vibrational bulk density $\rho_s$, due to packing rearrangements of the compact solids and the ratio thus determined, may be as low as 0.8, the conveyance force ratio as thus calculated exceeds 1.0 for conveyance of substantially compact solids whereas in a conduit carrying an aerated suspension a very considerably lower value of $$\frac{dp}{dl}$$

and a conveyance force ratio well below 1.0 based on the vibrational bulk density is found. Both compact and aerated solids may exist in the same conduit and is a desirable operation in such processes as contact coking wherein the solids increase the size during operation. The increased solids attrition due to the aeration reduces this particle size and may be controlled to balance one effect against the other. In most other cases it is desirable to maintain the entire mass of solids in compact form for minimum energy requirement and solids attrition rate.

Thus in the present invention the granular solids are conveyed in substantially compact form by means of a concurrently depressuring conveyance fluid, if the operating bulk density is not more than 20% less than the static vibrational bulk density, or if there is an increase in pressure differential with increase in fluid flow rate, or if the conveyance force ratio is greater than 1.0.

Each solid particle is continuously in direct contact with several other particles surrounding it and are not free to move relative to them differentiating those conveyance operations in which the solids are aerated, fluidized or otherwise suspended in a fluid and have operating bulk densities always considerably less than 80% of the vibrational or static bulk density.

The solids to inner conduit wall angle of repose $\alpha°$ is defined as the maximum inclination (with respect to a horizontal plane) of a conduit full of granular solids at which the granular solids will not flow therethrough by gravitational forces alone. Gravity flow of solids can occur only when a conduit has an inclination greater than $\alpha°$. In all other flow directions a conveyance force is required to cause motion. Such other flow directions pass through the apex of and are included in the solid angle formed from rotating about a vertical axis the $(90+\alpha)°$ angle struck downward from that axis. The process and apparatus of the present invention is primarily applicable to the conveyance of granular solids in directions included in the solid angle defined above, but it is also applicable though part of the conveyance path is along a direction outside this solid angle.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. A method for the conveyance of granular solids which comprises establishing a solids redirection zone communicating with an elongated conveyance zone, flowing granular solids by gravity into said redirection zone cocurrently with a conveyance fluid under pressure, depressuring said conveyance fluid successively through said redirection and conveyance zones to establish a conveyance force ratio exceeding 1.0, maintaining solids in said zones in substantially compact form, and maintaining a conveyance fluid pressure gradient within said redirection zone which increases in the direction of flow therein.

2. A method for the conveyance of granular solids which comprises flowing granular solids downwardly together with a conveyance fluid under pressure into a redirection zone communicating with an elongated conveyance zone, depressuring said conveyance fluid cocurrently with said granular solids flow at an increasing rate with distance through said redirection zone and at a substantially constant rate with distance through said conveyance zone, and maintaining the flowing solids in substantially compact form by applying a thrust force to the discharge of granular solids from said conveyance zone.

3. A method for the conveyance of granular solids which comprises flowing a moving unfluidized bed of granular solids downwardly into a redirection zone which communicates with an elongated conveyance zone, depressuring a conveyance fluid successively through the solids in said redirection zone at an increasing rate with distance therethrough and through the solids in said conveyance zone at a substantially constant rate with distance therethrough to overcome opposing forces of gravity and friction acting on said solids, and restricting the discharge of the substantially compact moving bed of said solids discharging from said conveyance zone to maintain the solids throughout said redirection and conveyance zones at a bulk density substantially equal to the static bulk density of said solids when at rest.

4. A method according to claim 3 in combination with the step of passing said solids and said conveyance fluid from said redirection zone through a transition zone in which a pressure gradient which decreases with distance therethrough is maintained and into said conveyance zone.

5. A method for the conveyance of granular solids which comprises flowing a moving bed of substantially compact and unfluidized granular solids downwardly into a redirection zone communicating with an elongated conveyance zone, depressuring a conveyance fluid in cocurrent flow with said solids through said zones, maintaining said solids in said zones in substantially compact unfluidized form, maintaining a conveyance force ratio $$\frac{\frac{dp}{dl}}{\rho_s \cos \theta}$$

(wherein $$\frac{dp}{dl}$$

is the pressure gradient in pounds per square foot per foot, $\rho_s$ is the solids bulk density in pounds per cubic foot, and $\theta$ is the angular deviation of the flow direction from the vertical) at a value greater than about 1.1 at the outlet of said redirection zone and at values which increase therethrough and at a value greater than 1.0 throughout said conveyance zone.

6. A method for the conveyance of granular solids which comprises flowing a moving bed of granular solids downwardly into a redirection zone together with a conveyance fluid under pressure, depressuring said conveyance fluid through said redirection zone and through an elongated conveyance zone in cocurrent flow with said solids, maintaining the flowing solids in substantially compact unfluidized form, maintaining a conveyance force ratio.

$$\frac{\frac{dp}{dl}}{\rho_s \cos \theta}$$

(wherein $$\frac{dp}{dl}$$

is the pressure gradient in pounds per square foot per foot, $\rho_s$ is the solids bulk density in pounds per cubic foot, and $\theta$ is the angular deviation of the flow direction from the vertical) at a substantially constant value between 1.01 and 3.0 throughout said conveyance zone and a conveyance force ratio which increases during conveyance of solids through said redirection zone to a value at the outlet of said redirection zone which is between 1.2 and 5.0.

7. A method according to claim 6 in combination with the steps of flowing said solids from said redirection zone through a transition zone into said conveyance zone and reducing the conveyance force ratio during solids transit through said transition zone from a value between 1.5 and 3.0 to a value between 1.10 and 1.50.

8. A method according to claim 6 in combination with the step of passing said solids through a substantially vertical connecting zone into said redirection zone.

9. A method according to claim 6 in combination with the step of increasing the conveyance force ratio immediately adjacent the outlet and within said conveyance zone to values above those maintained within the conveyance zone whereby said solids are maintained in substantially compact and unfluidized form therein.

10. In a method for conveyance of granular solids which comprises depressuring a conveyance fluid cocurrently with solids through a conveyance zone while maintaining said solids in substantially compact unfluidized form, the improvement which comprises passing said solids downwardly into and subsequently through a redirection zone into said conveyance zone, and maintaining a pressure gradient in said redirection zone which increases in the direction of flow therein.

11. An apparatus for the conveyance of granular solids which comprises an induction vessel, an inlet conduit thereto for solids, an inlet conduit thereto for a conveyance fluid, an outlet conduit adapted to the downward discharge of solids from said vessel communicating with a curving redirection conduit in turn communicating with an elongated conveyance conduit, said curving redirection conduit being provided with a cross-sectional area which decreases in the direction of solids flow, and means for restricting the discharge of granular solids from said conveyance conduit.

12. An apparatus according to claim 11 wherein the cross-sectional area of said redirection conduit is decreased to between 40% and 95% of the cross-sectional area of the entrance of said conveyance conduit.

13. An apparatus for the conveyance of granular solids which comprises an induction chamber, an outlet adapted to the gravity flow of solids therefrom, an arcuate redirection conduit having an inlet communicating with said outlet and provided with a decreasing cross-sectional area, a transition conduit communicating with the outlet of said redirection conduit with the entrance to an elongated conveyance conduit, means for restricting the discharge of solids therefrom, said redirection conduit terminating in an opening of from 40% to 95% of the inlet area of said conveyance conduit, and said transition conduit having a cross-sectional area increasing from that of the redirection conduit outlet to that of the conveyance conduit inlet.

14. An apparatus according to claim 13 wherein said transition conduit is between 2 and 20 conveyance conduit inlet diameters in length.

15. An apparatus according to claim 13 wherein said means for restricting the solids discharge from said conveyance conduit comprises an outlet opening having between 60 and 99% of the maximum cross-sectional area of said conveyance conduit.

16. An apparatus according to claim 13 in combination with a connecting conduit of length between 1 and 5 times its own diameter adapted to gravity flow of solids therethrough and communicating said induction chamber outlet with the entrance to said arcuate redirection chamber.

17. An apparatus for the conveyance of granular solids which comprises in combination an induction chamber, separate inlet conduits opening thereinto for solids to be conveyed and for a conveyance fluid under pressure, an outlet for conveyance fluid and solids from the bottom of said chamber, a connecting conduit connected at the upper end to said outlet and disposed substantially vertically, an arcuate redirection conduit connected to the lower end of said connecting conduit in such a manner that the axis of said connecting conduit is tangent to the axis of said arcuate redirection conduit at the point of connection, said redirection conduit having a decreasing cross-sectional area with distance from the connection thereof to said connecting conduit, a transition conduit connected to the outlet opening of said redirection conduit in such a manner that the longitudinal axis thereof is tangent to the axis of said arcuate redirection zone at the point of connection, said transition conduit having an increasing cross-sectional area with distance from the connection thereof to the outlet of said redirection conduit, an elongated conveyance conduit connected to the outlet of said transition conduit, said conveyance conduit having an increasing cross-sectional area with distance from the point of connection with said transition conduit, and means for restricting the discharge of granular solids from the outlet of said conveyance conduit without substantial restriction of the discharge of conveyance fluid.

18. An apparatus according to claim 17 wherein the change in cross-sectional area of said arcuate redirection conduit is such that the outlet area thereof is between 40% and 95% at the entrance area of said conveyance conduit.

19. An apparatus according to claim 17 wherein the length of said transition conduit is between 2 and 20 times the diameter of the entrance of said conveyance conduit.

20. An apparatus according to claim 17 wherein the length of said connecting conduit is between 1 and 5 times the diameter of said outlet from the bottom of said induction chamber.

21. An apparatus for conveyance of granular solids which comprises in combination an induction chamber, an inlet conduit thereinto for solids to be conveyed, an inlet conduit thereinto for a conveyance fluid under pressure, an outlet for solids and fluid from the lower part of said induction chamber, an elongated conveyance conduit disposed at an axis different from the axis of solids flow through said outlet for solids from said induction chamber, a redirection conduit communicating the inlet of said conveyance conduit with said outlet for solids, said redirection conduit having a decreasing cross-sectional area in the direction of solids flow and means for applying a thrust force to the solids discharging from said conveyance conduit whereby said solids therein are prevented from fluidizing and are maintained in substantially compact form.

22. An apparatus according to claim 21 wherein the longitudinal axis of said redirection conduit is tangential to the axes of said outlet for solids and of said conveyance conduits at the respective points of communication therewith.

23. An apparatus according to claim 21 wherein said means for applying said thrust force comprises a transverse thrust plate disposed adjacent the outlet opening of said conveyance conduit.

24. An apparatus according to claim 21 wherein said means for applying said thrust force comprises a restricted outlet opening for solids from said conveyance conduit, said opening having a cross-sectional area less than the maximum cross-sectional area of said conveyance conduit, said restricted outlet being adapted to generate said thrust force immediately upon movement of substantially compact solids therethrough irrespective of the presence of such solids surrounding the outlet opening and thus prevent solids fluidization during conveyance.

25. An apparatus according to claim 24 wherein said restricted outlet opening has a cross-sectional area of between about 60% and about 99% of said maximum cross-sectional area.

References Cited in the file of this patent

UNITED STATES PATENTS

| Number | Name | Date |
|---|---|---|
| 2,311,564 | Munday | Feb. 16, 1943 |
| 2,493,911 | Brandt | Jan. 10, 1950 |

FOREIGN PATENTS

| Number | Country | Date |
|---|---|---|
| 206,618 | Germany | Nov. 7, 1907 |
| 180,397 | Great Britain | May 11, 1922 |
| 268,667 | Great Britain | Apr. 7, 1927 |